(12) United States Patent
Chen et al.

(10) Patent No.: US 11,036,437 B2
(45) Date of Patent: Jun. 15, 2021

(54) MEMORY CONTROLLER FOR STORAGE DEVICE, STORAGE DEVICE, CONTROL METHOD OF STORAGE DEVICE, AND RECORDING MEDIUM

(71) Applicant: SK hynix Inc., Gyeonggi-do (KR)

(72) Inventors: Chun-Shu Chen, Hsinchu County (TW); Lian-Chun Lee, Hsinchu County (TW); Ching-Chung Lai, Hsinchu County (TW)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/658,373

(22) Filed: Oct. 21, 2019

(65) Prior Publication Data

US 2020/0233611 A1 Jul. 23, 2020

(30) Foreign Application Priority Data

Jan. 17, 2019 (TW) .................................. 108101788

(51) Int. Cl.

| G06F 3/06 | (2006.01) |
|---|---|
| G06F 13/16 | (2006.01) |
| G06F 12/0868 | (2016.01) |
| G06F 12/1081 | (2016.01) |
| G06F 13/42 | (2006.01) |

(52) U.S. Cl.
CPC ............ *G06F 3/0659* (2013.01); *G06F 3/061* (2013.01); *G06F 3/0611* (2013.01); *G06F 3/0679* (2013.01); *G06F 12/0868* (2013.01); *G06F 12/1081* (2013.01); *G06F 13/161* (2013.01); *G06F 13/1668* (2013.01); *G06F 13/4234* (2013.01); *G06F 13/1615* (2013.01); *G06F 13/1626* (2013.01)

(58) Field of Classification Search
CPC .... G06F 3/0659; G06F 13/4234; G06F 3/061; G06F 13/161; G06F 3/0611; G06F 13/1668; G06F 12/0868; G06F 12/1081; G06F 3/0679; G06F 13/1626; G06F 13/1615

See application file for complete search history.

(56) References Cited

U.S. PATENT DOCUMENTS

| 8,185,760 | B2 * | 5/2012 | Takakura | G06F 1/08 713/320 |
|---|---|---|---|---|
| 9,541,987 | B2 * | 1/2017 | Cooper | G06F 1/3268 |
| 2007/0162946 | A1 * | 7/2007 | Geile | H04N 7/17309 725/119 |
| 2017/0060460 | A1 | 3/2017 | Sugahara et al. | |
| 2018/0089079 | A1 * | 3/2018 | Hansson | G06F 13/1663 |
| 2020/0174705 | A1 * | 6/2020 | Qawami | G06F 3/0679 |
| 2020/0210110 | A1 * | 7/2020 | Richter | G06F 3/0604 |
| 2020/0341652 | A1 * | 10/2020 | Wu | G06F 3/0658 |

* cited by examiner

*Primary Examiner* — Sean D Rossiter
(74) *Attorney, Agent, or Firm* — IP & T Group LLP

(57) ABSTRACT

A control method of a storage device wherein a host cannot transfer a command to the storage device when the storage device transfers data to the host, after which there is a data transfer delay time period and no data is transferred to the host until a read command is received from the host, the control method comprising the steps of: detecting, by a memory controller of the storage device, a host delay time of the host each time a read command is received from the host during the data transfer delay time period; and adjusting, by the memory controller, the data transfer delay time period based on one or more of the detected host delay times.

19 Claims, 7 Drawing Sheets

---

Memory controller of storage device has data transfer delay time period after transferring data to the host, and detects host delay time of host multiple times, when receiving read command from host during each data transfer delay time period. During data transfer delay time period, memory controller does not transfer any data transfer requests to host until read command of host is received. ~S10

Memory controller adjusts data transfer delay time period based on host delay times of host, detected by memory controller ~S20

FIG.3

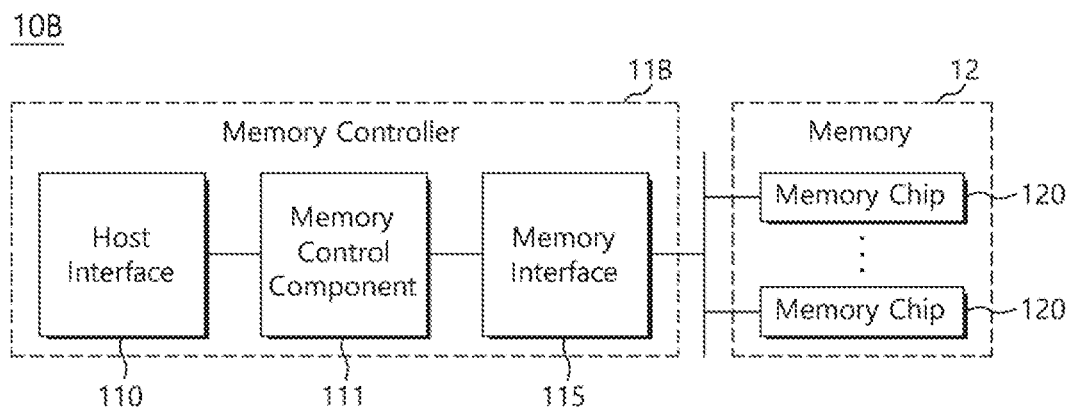

FIG.4

| Memory controller of storage device has data transfer delay time period after transferring data to the host, and detects host delay time of host multiple times, when receiving read command from host during each data transfer delay time period . During data transfer delay time period, memory controller does not transfer any data transfer requests to host until read command of host is received. | ~S10 |

↓

| Memory controller adjusts data transfer delay time period based on host delay times of host, detected by memory controller | ~S20 |

MEMORY CONTROLLER FOR STORAGE DEVICE, STORAGE DEVICE, CONTROL METHOD OF STORAGE DEVICE, AND RECORDING MEDIUM

CROSS-REFERENCE TO RELATED APPLICATION

The present application claims priority under 35 U.S.C. § 119(a) to Taiwan application number 108101788, filed on Jan. 17, 2019, in the Taiwan Intellectual Property Office, which is incorporated herein by reference in its entirety.

BACKGROUND

1. Technical Field

Various embodiments generally relate to a data storage technology, and more particularly, to a memory controller for a storage device, a storage device, a control method of a storage device, and a recording medium.

2. Related Art

A computing device such as a computer or server executes a program to process data. For example, when extracting a photograph, playing audio or video, performing an operation, or performing network communication, the computing device often needs to request a storage device to perform a data read operation in a time efficient manner. When a relatively large delay is present between data read operations during a random read process, the delay may have an influence on the entire read efficiency.

In many storage systems, when a storage device and a host transfer frames at the same time, a collision occurs. In this case, the storage device has priority over the host. In such a situation, when the storage device sends a direct memory access (DMA) setup frame information structure (FIS) to the host to enter a data transfer step, the host cannot typically send any commands to the storage device. For example, the host needs to stop transferring information frames to the storage device, until the storage device completes data transfer.

The host itself may have a host delay. Therefore, when the storage device continuously enters the data transfer step in response to multiple read commands after the host sends such commands to the storage device, the host can often transfer a new read command to the storage device only after the storage device completes multiple data transfer steps in response to the multiple read commands. In such a situation, a relatively large delay occurs between the data read operations because the storage device has priority over the host and the host itself has a host delay. Thus, the delay may have an influence on the entire read efficiency.

SUMMARY

In an embodiment, there is provided a control method of a storage device wherein a host cannot transfer a command to the storage device when the storage device transfers data to the host, after which there is a data transfer delay time period and no data is transferred to the host until a read command is received from the host, the control method comprising the steps of: detecting, by a memory controller of the storage device, a host delay time of the host each time a read command is received from the host during the data transfer delay time period; and adjusting, by the memory controller, the data transfer delay time period based on one or more of the detected host delay times.

The detecting step may comprises setting, by the memory controller, an initial value of the data transfer delay time period; detecting the host delay time each time the read command is received from the host during the data transfer delay time period; and repeating the detecting of the host delay time a set number of times defined by a detection threshold value.

The data transfer delay time period is adjusted to a maximum value of the detected host delay times.

The data transfer delay time period is used for a direct memory access setup command.

The memory controller performs the detecting during an operation in a first state, and performs the adjusting during an operation in a second state, and the control method comprises switching the memory controller from the second state to the first state to perform the detecting, and redetecting the host delay time of the host, when the memory controller in the second state does not receive a read command from the host during each of the adjusted data transfer delay time periods.

The control method further comprising switching the memory controller from the second state to the third state, when the memory controller in the first state does not consecutively a read command from the host during the data transfer delay time period, wherein there is no data transfer delay time period after the memory controller in the third state transfers data to the host.

The control method further comprising switching the memory controller from the third state to the first state to detect the host delay time, when the memory controller in the third state receives a read command from the host a plurality of times.

The storage device communicates with the host using a Serial Advanced Technology Attachment (SATA)-based protocol.

The memory controller sores a program code for controlling a processor of a storage device to execute the control method.

In an embodiment, there is provided a memory controller for a storage device wherein a host cannot transfer a command to the storage device when the storage device transfers data to the host, after which there is a data transfer delay period and no data is transferred to the host until a read command is received from the host, the memory controller comprising: a host interface configured to communicate with the host; and a memory control component coupled to the host interface, and configured to: receive one or more commands from the host by communicating with the host through the host interface, and access data stored in the storage device; detect a host delay time of the host each time a read command is received from the host during the data transfer time period; and adjust the data transfer delay time period based on one or more of the detected host delay times.

The memory control component adjusts the data transfer delay time period to a maximum value of the detected host delay times.

The data transfer delay time period is used for a direct memory access setup command.

The memory control component detects each host delay time of the host during an operation in a first state; the memory control component adjusts the data transfer delay time period during an operation in a second state; and the memory control component is switched from the second state to the first state to redetect the host delay time of the host, when the memory control component in the second state does not receive a read command from the host during each of the adjusted data transfer delay time periods.

The memory control component is switched from the second state to the third state, when the memory control component in the first state does not consecutively a read command from the host during the data transfer delay time period, wherein there is no data transfer delay time period after the memory control component in the third state transfers data to the host.

The memory control component is switched from the third state to the first state to detect the host delay time, when the memory control component in the third state receives a read command from the host a plurality of times.

The storage device communicates with the host using a Serial Advanced Technology Attachment (SATA)-based protocol.

In an embodiment, a storage device may include: a memory configured to store data; wherein the memory controller is coupled to the memory and configured to access the memory of the storage device through communication with the host.

A storage device comprising the memory controller further comprising: a memory configured to store data; wherein the memory controller is coupled to the memory and configured to access the memory of the storage device through communication with the host.

The storage device further comprising a memory interface coupled to the memory and configured to access the memory, wherein the memory interface is disposed within the memory controller.

In an embodiment, there is provided a control method of a storage device wherein providing a host with responses in response to one or more access requests from the host while waiting, after the transmission of each of the responses, an interval of intermission time for a subsequent access request from the host; and adjusting the intermission time based on one or more host delays of the subsequent access requests, wherein the controller and the host provide the responses and the access requests in a half-duplex way, and wherein each of the host delays is a time from a start of the corresponding intermission time to reception of a corresponding access request.

BRIEF DESCRIPTION OF THE DRAWINGS

FIG. 3 is a block diagram illustrating another example of the memory controller of the storage device of FIG. 1.

FIG. 4 is a flowchart illustrating a control method of a storage device in accordance with an embodiment.

DETAILED DESCRIPTION

In order to promote understanding of the purposes, features and effects of the present invention, details thereof are described in the context of specific embodiments with reference to the accompanying drawings. Throughout the specification, reference to "an embodiment," "another embodiment" or the like is not necessarily to only one embodiment, and different references to any such phrase are not necessarily to the same embodiment(s).

Figure 1:
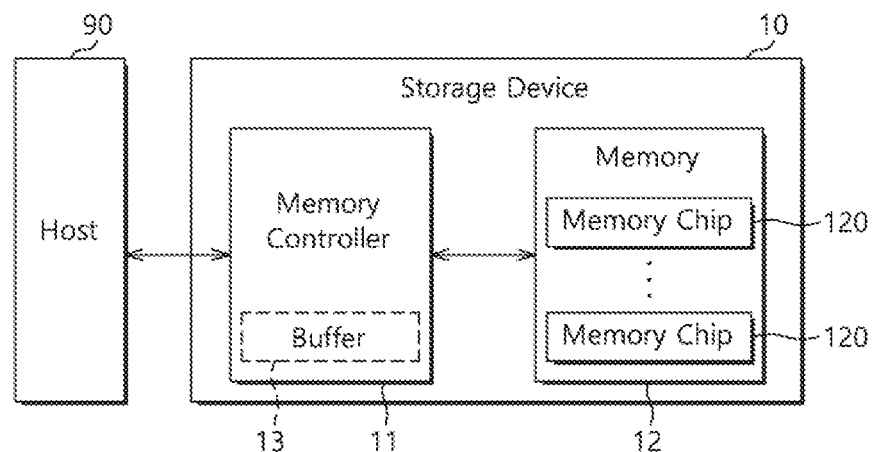
FIG. 1 is a block diagram illustrating a storage device in accordance with an embodiment.
Figure 2:
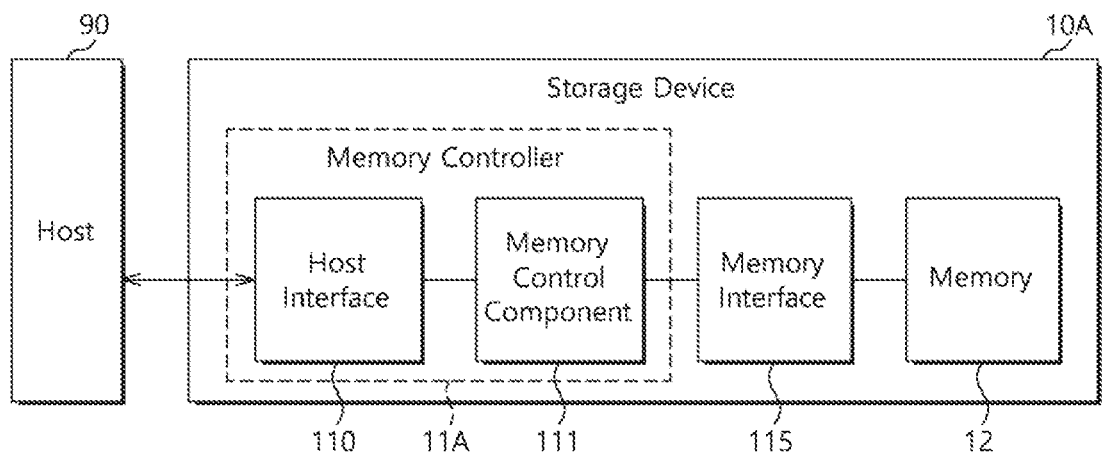
FIG. 2 is a block diagram illustrating an example of a memory controller of the storage device of FIG. 1.

Each of FIGS. 1, 2 and 3 illustrates a storage device in accordance with an embodiment. The storage device or a memory controller illustrated in any of FIGS. 1, 2 and 3 may be used to implement any of the control methods of a storage device illustrated and described herein, particularly with reference to FIGS. 4 and 5.

As illustrated in FIG. 1, the storage device 10 may include a memory controller 11 and a memory 12. The memory 12 may serve to store data, and include a plurality of memory chips 120. For example, the memory chip 120 may be a flash memory such as a NOR-type memory or NAND-type memory, but the present invention is not limited to any particular type of memory chip.

The memory controller 11 may be coupled to the memory 12 and receive a command of a host 90 through communication with the host 90, and access the memory 12 of the storage device 10 according to the command. The host 90 may be a computing device such as a computer or server, for example.

The storage device 10 may further include a buffer 13, and the buffer 13 may be implemented with a volatile memory or nonvolatile memory. The buffer 13 may be included in the memory controller 11 or disposed externally to the memory controller 11. When the memory 12 of the storage device 10 is accessed, the buffer 13 may be used to store a command queue or temporarily store data from the host 90 or the memory 12. Furthermore, the buffer 13 may be used to store a program code which is to be executed by a processor of the memory controller 11 (for example, a microprocessor or the like).

As illustrated in FIG. 2, a storage device 10A in accordance with another embodiment may include a memory controller 11A, a memory interface 115 and a memory 12. The memory controller 11A may be coupled to the memory 12 through the memory interface 115, receive a command of the host 90 through communication with the host 90, and request the memory interface 115 to perform an access operation on the memory 12 of the storage device 10A according to the command. The memory interface 115 may be a flash memory controller, for example. The memory controller 11A may include a host interface 110 and a memory control component 111. The host interface 110 may communicate with the host 90, and the memory control component 111 may be coupled to the host interface 110, receive one or more commands from the host 90 by communicating with the host 90 through the host interface 110, and access data of the storage device 10A. The host interface 110 may be implemented based on a transfer protocol used between the host 90 and the storage device 10A. Under the supposition that the storage device 10A communicates with the host 90 using a SATA (Serial Advanced Technology Attachment)-based protocol, for example, the host interface 110 may be a SATA interface controller.

As illustrated in FIG. 3, a memory controller 11B of a storage device 10B may include a host interface 110, a memory control component 111 and a memory interface 115. In various other embodiments, the storage device may be a serial attached storage device, a SCSI/SAS storage device, a fiber channel (FC) storage device, a USB storage device or other storage device. The present invention is not limited to any particular type of storage device.

FIG. 4 is a flowchart illustrating a control method of a storage device in accordance with an embodiment. The embodiment illustrated in FIG. 4 may be applied to the storage device or the memory controller illustrated in FIG. 1, 2 or 3. When the storage device 10, 10A or 10B transfers data to the host 90, the host 90 cannot transfer a command to the storage device. That is, the storage device (for example, 10, 10A or 10B) and the host 90 provide signals to each other in a half-duplex way. As illustrated in FIG. 4, the control method of the storage device 10, 10A or 10B in accordance with an embodiment may include steps S10 and S20.

In step S10, the memory controller 11, 11A or 11B may have a data transfer delay time period after transferring data to the host 90. Whenever receiving a read command from the host 90 during the data transfer delay time period, the memory controller 11, 11A or 11B of the storage device 10, 10A or 10B may detect a host delay time of the host 90 a plurality of times. During the data transfer delay time period, the memory controller 11, 11A or 11B may not transfer any data to the host 90 until a read command of the host 90 is received. The host delay time is a time period from a start of the data transfer to reception of the read command.

In step S20, the memory controller 11, 11A or 11B may adjust the data transfer delay time period based on the plurality of host delay times detected by the memory controller 11, 11A or 11B.

When the control method of FIG. 4 is implemented, the steps may be carried out through the memory control component 111 or the host interface 110 of the memory controller 11, 11A or 11B.

The control method of FIG. 4 can implement the operation of adjusting the data transfer delay time period of the storage device 10, 10A or 10B based on the detected host delay times. For example, the control method of FIG. 4 may help the storage device 10, 10A or 10B to find a data transfer delay time period which is currently suitable for the host 90. Some embodiments may be used to improve efficiency when the host 90 sends a read command to the storage device 10, 10A or 10B, thereby improving efficiency when the host 90 performs a random read operation on the storage device 10, 10A or 10B.

For example, when a collision occurs between the storage device 10, 10A or 10B and the host 90 in many storage systems as the storage device 10, 10A or 10B and the host 90 transfer information frames at the same time, the storage device 10, 10A or 10B may have priority over the host 90. Thus, when the storage device 10, 10A or 10B transfers data to the host 90, the host 90 cannot transfer a command to the storage device 10, 10A or 10B. Furthermore, since a host delay is present due to internal factors of the host 90, which are different depending on each manufacturer, model or specification, and the host 90 is likely to be changed due to external factors such as an operation environment, the host delay time may often vary within one range under a situation where multiple factors are mixed.

In such a situation, the memory controller 11, 11A or 11B may have the data transfer delay time period after transferring data to the host 90, through step S10 of the control method of the storage device 10, 10A or 10B in accordance with the present embodiment. When an initial value of the data transfer delay time period is set to a larger value than the host delay time, the number of chances that the host 90 will send a read command to the storage device 10, 10A or 10B may be increased through step S10. Thus, the host delay time may be detected.

Since the data transfer delay time period may increase the time between data transfer steps, the memory controller 11, 11A or 11B may adjust the data transfer delay time period of the storage device 10, 10A or 10B according to the detected host delay time, through step S20. For example, the memory controller 11, 11A or 11B may help the storage device 10, 10A or 10B to find a data transfer delay time period which is currently suitable for the host 90. Therefore, the storage device 10, 10A or 10B may be used to improve the efficiency when the host 90 sends a read command to the storage device 10, 10A or 10B, thereby improving the efficiency when the host 90 performs a random read operation on the storage device 10, 10A or 10B.

Hereafter, various implementations based on the control method of FIG. 4 are described in the context of multiple embodiments.

Figure 5:
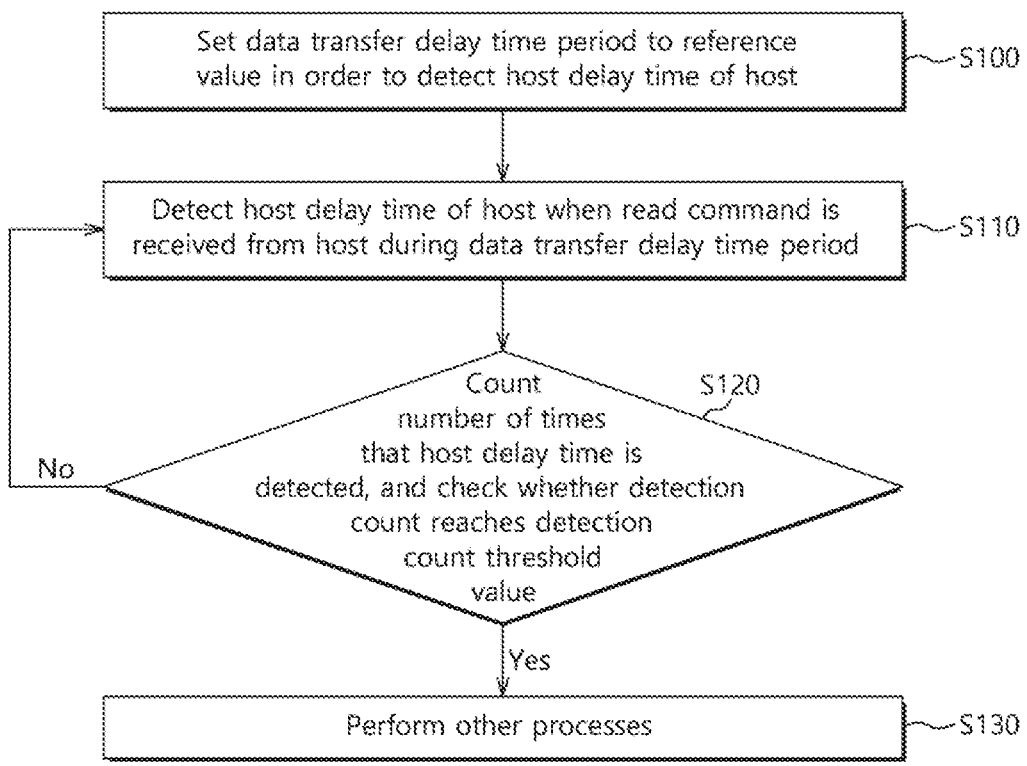
FIG. 5 is a flowchart illustrating exemplary operations of step S10 of FIG. 4 in accordance with an embodiment.

FIG. 5 is a flowchart illustrating an example of step S10 of FIG. 4. Step S10 may include steps S100, S120 and S130.

In step S100, the memory controller 11, 11A or 11B may set the data transfer delay time period to a reference value in order to detect the host delay time.

In step S110, when a read command is received from the host 90 during the data transfer delay time period, the memory controller 11, 11A or 11B may detect the host delay time. For example, the memory controller 11, 11A or 11B may detect the host delay time by recording time elapsed from the start of the data transfer delay time period until the read command of the host 90 is received, and display the detected host delay time.

In step S120, the memory controller 11, 11A or 11B may count a number of times that the host delay time is detected to generate a detection count, and check whether the detection count reaches a detection count threshold value. For example, the detection count threshold value may be set to 10, 100, 200, 500, 1000 or other suitable value. When the detection count does not reach the detection count threshold value, the memory controller 11, 11A or 11B may perform step S110 again to detect a host delay of the host.

When the detection count reaches the detection count threshold value, the memory controller 11, 11A or 11B may perform other processes in step S130. Step S130 may be implemented in various ways. For example, step S130 may include stopping detection and performing step S20. For another example, step S130 may include deciding one estimated value based on the detected host delay times, and the estimated value may be used when step S20 is performed. However, the operations of S130 are not limited to the above-described examples.

Figure 6:
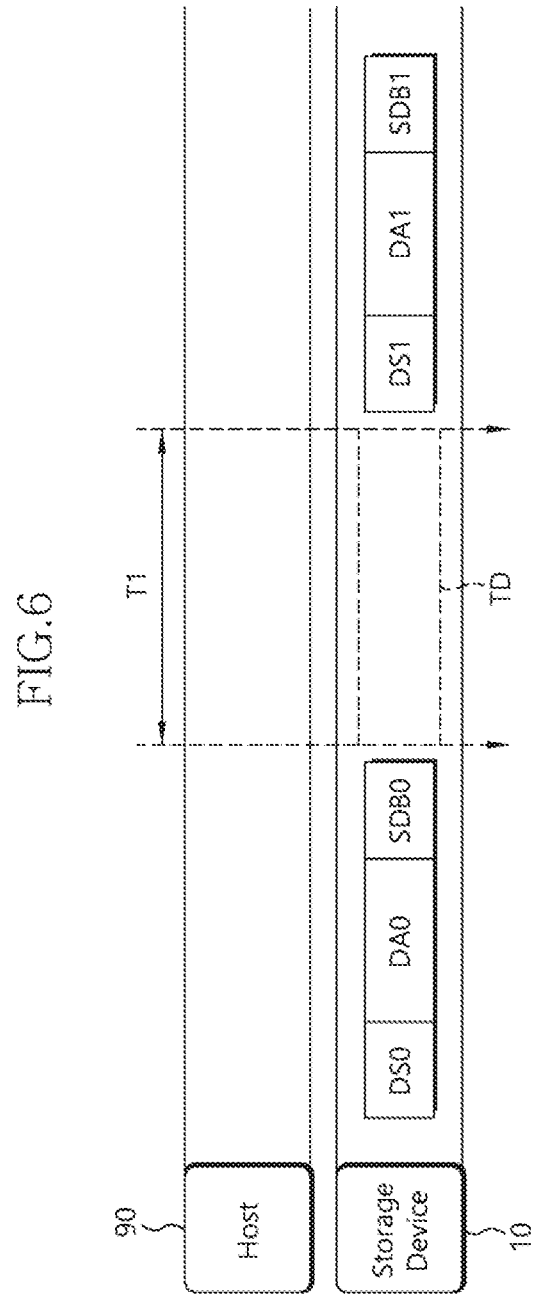
FIG. 6 is a diagram for describing an example of a data transfer delay time period of the storage device.

FIG. 6 is a diagram for describing an example of the data transfer delay time period of the storage device 10, 10A or 10B. FIG. 6 illustrates a time line with respect to the host 90 and the storage device 10, 10A or 10B, respectively, and shows the sequential order in which the host 90 and the storage device 10, 10A or 10B transfer information through their transmission channels, according to time change. The time axis of FIG. 6 runs from left to right. In FIG. 6, a solid block (for example, DS0, DA0 or the like) may indicate information transferred by the host 90 or the storage device 10, 10A or 10B, for example, a command, data or information frame, and a dotted block in the time line of the storage device 10, 10A or 10B may indicate a data transfer delay time period.

The following description is based on the supposition that a SATA-based transfer channel is used between the host 90 and the storage device 10, 10A or 10B, but the present invention is not limited thereto. As illustrated in FIG. 6, the storage device 10, 10A or 10B or the memory controller 11, 11A or 11B may transfer data to the host 90 in response to a previous read command transferred by the host 90. For example, the storage device 10, 10A or 10B may transfer information frames DS0, DA0 and SDB0, thereby completing the data transfer for the read command.

Among the information frames, DS0 may represent a DMA setup FIS transferred to the host 90 by the storage device 10, 10A or 10B, DA0 may represent a data FIS transferred to the host 90 by the storage device 10, 10A or 10B, and SDB0 may represent a set device bits FIS transferred to the host 90 by the storage device 10, 10A or 10B, for example.

The information frames of the above-described example may be defined in the SATA-based transfer protocol, but the present invention is not limited to the example.

In step S10 or S120, the memory controller 11, 11A or 11B may have the data transfer delay time period after transferring data to the host 90, in order to perform detection. Referring back to FIG. 6, the storage device 10, 10A or 10B may wait time T1 corresponding to the data transfer delay time period indicated as a dotted block TD in FIG. 6, after transferring the information frame SDB0.

For example, the data transfer delay time period TD may be used for a DMA setup command.

During the data transfer delay time period TD, the storage device 10, 10A or 10B or the memory controller 11, 11A or 11B may not transfer any data to the host 90 until the storage device 10, 10A or 10B or the memory controller 11, 11A or 11B receives a read command from the host 90.

Two cases are described below, one in which the host 90 does not send a read command during the data transfer delay time period TD and another in which the host 90 sends a read command during the data transfer delay time period TD.

As illustrated in FIG. 6, the host 90 may not send a read command during the data transfer delay time period TD. Thus, the storage device 10, 10A or 10B or the memory controller 11, 11A or 11B may not transfer any data to the host 90 during the data transfer delay time period TD. When the storage device 10, 10A or 10B or the memory controller 11, 11A or 11B has a plurality of read commands which are still not processed after the data transfer delay time period TD ends, (for example, when data transfer operations for read commands which have been transferred by the host 90 before are not completely performed after the TD ends), the storage device 10, 10A or 10B or the memory controller 11, 11A or 11B may transfer data to the host 90 after the TD ends. For example, the storage device 10, 10A or 10B or the memory controller 11, 11A or 11B may transfer information frames DS1, DA1 and SDB1 after the TD ends, thereby completing data transfer for one read command. The information frames may have the same meanings as the information frames DS0, DA0 and SDB0, and the numbers 0 and 1 of the information frame symbols may indicate the sequential order. However, the present invention is not limited to the above-described example.

Figure 7:
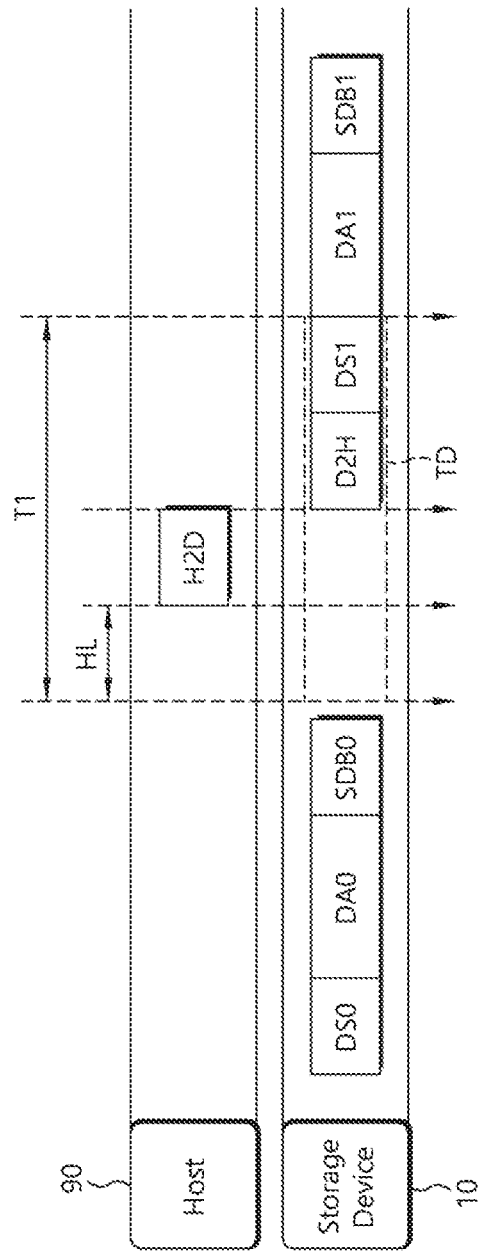
FIG. 7 is a diagram for describing an operation of detecting a host delay time of a host in accordance with an embodiment.

FIG. 7 is a diagram for describing an example of the operation of detecting a host delay time. As illustrated in FIG. 7, the host 90 may transfer a read command, for example, an information frame H2D, during the data transfer delay time period T1. The information frame H2D may indicate a host-to-device FIS transferred to the storage device 10, 10A or 10B by the host 90, for example. The information frame H2D may be defined in a SATA-based transfer protocol, but the present invention is not limited to these details.

In step S110, when a read command is received from the host 90 during the data transfer delay time period T1, the host delay time may be detected. For example, the storage device 10, 10A or 10B or the memory controller 11, 11A or 11B may start a timer when the data transfer delay time period T1 starts, and stop the timer when receiving the read command of the host 90. At this time, the time value acquired by the timer may be set to the detected host delay time, for example, time indicated by HL in FIG. 7. The timer may be implemented in any suitable way, such as by an analog circuit, a logical circuit, firmware, a program and combinations thereof.

When it is assumed that the storage device 10, 10A or 10B or the memory controller 11, 11A or 11B has no read commands to be processed other than the read command represented by the information frame H2D, the storage device 10, 10A or 10B or the memory controller 11, 11A or 11B may resume transferring data for the read command to the host 90 in response to a previous read command. For example, the storage device 10, 10A or 10B or the memory controller 11, 11A or 11B may transfer information frames D2H, DS1, DA1 and SDB1, thereby completing the data transfer for the previous read command. The information frame D2H may indicate a device-to-host FIS transferred to the host 90 by the storage device 10, 10A or 10B, for example. The information frame D2H may be defined in a SATA-based transfer protocol, but the present invention is not limited to such protocol.

As described with reference to the examples of FIGS. 6 and 7, various read commands or data transfer operations may be performed between the host 90 and the storage device 10, 10A or 10B. Therefore, the storage device 10, 10A or 10B or the memory controller 11, 11A or 11B may detect multiple host delay times, one for each transfer, and count the number of times that the host delay time is detected. After the detection count reaches the threshold value, the storage device 10, 10A or 10B or the memory controller 11, 11A or 11B may adjust the data transfer delay time period T1 using one or more of the detected host delay times. For example, when the initial value of the data transfer delay time period T1 is set to 2.2 μs, the detected host delay times may fall within area range of 0.8 to 1.2 μs, after the detection is performed 100 or more times. Thus, the storage device 10, 10A or 10B or the memory controller 11, 11A or 11B may select the maximum value of the detected host delay times, for example, 1.2 μs, and adjust the data transfer delay time period T1 based on the maximum value.

For example, the storage device 10, 10A or 10B or the memory controller 11, 11A or 11B may adjust the data transfer delay time period T1 from 2.2 μs to 1.2 μs or further add allowable additional time to the adjusted data transfer delay time period of 1.2 μs. The allowable additional time may be a constant value or related to the range of the detected host delay time. For example, 0.2 μs ((1.2−0.8)/2=0.2) may be taken as the allowable additional time. For example, the storage device 10, 10A or 10B or the memory controller 11, 11A or 11B may adjust the data transfer delay time period T1 suitably for various conditions based on the maximum value of the host delay time area, thereby increasing the number of chances that the read command will be successfully received after the host 90 sends the read command to the storage device 10, 10A or 10B.

Furthermore, when the adjusted data transfer delay time period T1 is less than the initial value of the data transfer delay time period T1, the entire data read efficiency may be improved. In particular, during a plurality of random read operations, the host 90 may effectively transfer read commands during the adjusted data transfer delay time period T1. In another embodiment, the storage device 10, 10A or 10B or the memory controller 11, 11A or 11B may adjust the data transfer delay time period T1 based on the average value of the detected host delay times or the maximum value or minimum value of the detected host delay times. The data transfer delay time period T1 may also be adjusted using other statistics of the detected host delay times.

For example, the storage device 10, 10A or 10B or the memory controller 11, 11A or 11B may set the data transfer delay time period T1 to a larger value than a general host delay time.

Figure 8:
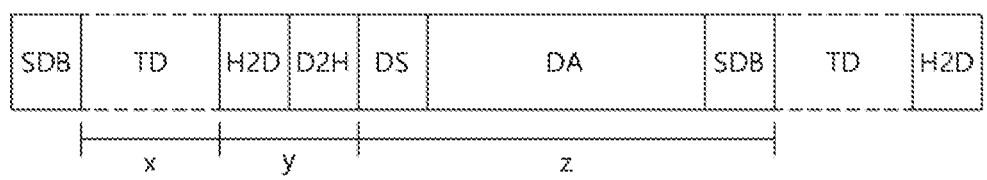
FIG. 8 is a diagram for describing an operation of estimating a data transfer delay time period of the storage device in accordance with an embodiment.

FIG. 8 is a diagram for describing an operation of estimating the data transfer delay time period of the storage device 10, 10A or 10B. As illustrated in FIG. 8, parameters x, y and z may be defined in order to estimate processing time required for one random read operation.

Here, x represents the host delay time. y represents the time required until the storage device 10, 10A or 10B generates an information frame in response to one read command after the host 90 transfers the read command. For example, y may include time of the information frames H2D and D2H. Furthermore, z represents the time required for transferring data, which is read from the storage device 10, 10A or 10B in response to a read command from the host 90, to the host 90. For example, z may include time of information frames DS, DA and SDB.

The processing time pt required for one random read operation may be estimated by pt=x+y+z (unit: microsecond, is). Input/output operations per second (IOPS) may be a measurement parameter for testing the performance of the storage device 10, 10A or 10B. The IOPS may be considered as the number of read/write operations per second. Based on the processing time required for one random read operation, the IOPS may be represented in equation 1 as follows.

$$\text{IOPS}=(1/pt)\times 1000000=(1/(x+y+z))\times 1000000 \quad \text{Equation 1}$$

An example in which the initial value of the data transfer delay time period is estimated through the parameters x, y and z of FIG. 7 and Formula 1 is described below. In the present example, desired IOPS may be set to a target value, and the target value may be decided based on a value which is to be achieved by the storage device 10, 10A or 10B. Since the processing times of the parameters y and z can be acquired by inference or estimation, the parameter x may be calculated according to equation 2 as follows.

$$x=(1000000/\text{IOPS})-y-z \quad \text{Equation 2}$$

For example, when the desired IOPS=80000, y=1.5 μs, and z=8.8 μs, x=(1000000/80000)−1.5−8.8=2.2 μs.

Therefore, the maximum allowable host delay time (for example, 2.2 μs) may be taken as the initial value of the data transfer delay time period. However, the initial value of the data transfer delay time period may also be decided by other methods. For example, the initial value of the data transfer delay time period may be estimated based on past results or experiments.

In some embodiments, the control method of FIG. 4 may be implemented by a state machine method of the memory controller 11, 11A or 11B. For example, the control method of FIG. 4 may be implemented by a state machine having a first state and a second state. For another example, the control method of FIG. 4 may be implemented by a state machine having a first state, a second state and a third state.

In an embodiment of the control method of FIG. 4, the memory controller 11, 11A or 11B of the storage device 10, 10A or 10B may perform step S10 in the first state, and perform step S20 in the second state.

The control method in accordance with an embodiment may further include the memory controller 11, 11A or 11B is switched from the first state to the second state to perform step S20, when the number of times that the host delay time is detected reaches the detection count threshold value. Furthermore, the control method in accordance with an embodiment may further include acquiring one of the detected host delay times, when the detection count reaches the detection count threshold value. This host delay time may be used when step S20 is performed in the second state. For example, the memory controller 11, 11A or 11B may adjust the data transfer delay time period according to the value. As exemplified above, after the detection count reaches the threshold value, the storage device 10, 10A or 10B or the memory controller 11, 11A or 11B may adjust the data transfer delay time period T1 using the detected host delay times. For example, when the initial value of the data transfer delay time period T1 is set to 2.2 μs, the detected host delay times may fall within a range of 0.8 to 1.2 μs, after the detection is performed multiple times corresponding to the detection count threshold value. Thus, the storage device 10, 10A or 10B or the memory controller 11, 11A or 11B may select the maximum of the detected host delay times, for example, 1.2 μs, and adjust the data transfer delay time period T1 based on the maximum detected host delay time.

The control method in accordance with an embodiment may further include the memory controller 11, 11A or 11B is switched from the second state to the first state to perform step S10 again and re-detecting the host delays, when the read command is not consecutively received from the host 90 during the data transfer delay time period which has been adjusted while the memory controller 11, 11A or 11B being in the second state, for example, when the number of times that the read command is not received from the host 90 reaches a threshold value while the memory controller 11, 11A or 11B is in the second state. In accordance with an embodiment, the memory controller 11, 11A or 11B of the storage device 10, 10A or 10B may additionally adjust the data transfer delay time period, thereby promoting the host 90 to effectively transfer the read command.

In implementing the control method of FIG. 4 with a state machine, such machine may have different numbers of states. In this way, the storage device 10, 10A or 10B can learn to adjust the data transfer delay time period, and thus find a suitable data transfer delay time period to cope with a host delay situation of the host 90. Therefore, the data read efficiency may be improved.

The control method of FIG. 4 in accordance with an embodiment may further include the memory controller 11, 11A or 11B is switched from the first state to the third state when the memory controller 11, 11A or 11B in the first state does not consecutively receive read commands from the host 90 during the data transfer delay time period, for example, when the number of times that the read command is not received from the host 90 reaches the threshold value while the memory controller 11, 11A or 11B being in the first state.

In the third state, after the memory controller 11, 11A or 11B in the third state transfers data to the host 90, there is no data transfer delay time period. The control method in accordance with an embodiment may switch the memory controller 11, 11A or 11B to the third state to remove the data transfer delay time and to stop detecting the host delay time, when the host 90 does not need to read data or does not need to consecutively read data after the memory controller 11, 11A or 11B of the storage device 10, 10A or 10B has adjusted the data transfer delay time period. Thus, the control method can help the storage device 10, 10A or 10B to avoid a burden of computing resources caused by unnecessary detection.

The control method of FIG. 4 in accordance with an embodiment may further include the memory controller 11, 11A or 11B is switched from the third state to the first state to detect the host delay time, when the memory controller 11, 11A or 11B receives a read command from the host 90 a plurality of times while the memory controller 11, 11A or 11B being in the third state, for example, when the number of times that a read command is received from the host 90 reaches the threshold value while the memory controller 11, 11A or 11B being in the third state. In an embodiment, the memory controller 11, 11A or 11B is switched to the first state to re-detect the host delay time, when the host 90 retransfers a plurality of read commands after the memory controller 11, 11A or 11B of the storage device 10, 10A or 10B has adjusted the data transfer delay time period.

Figure 9:
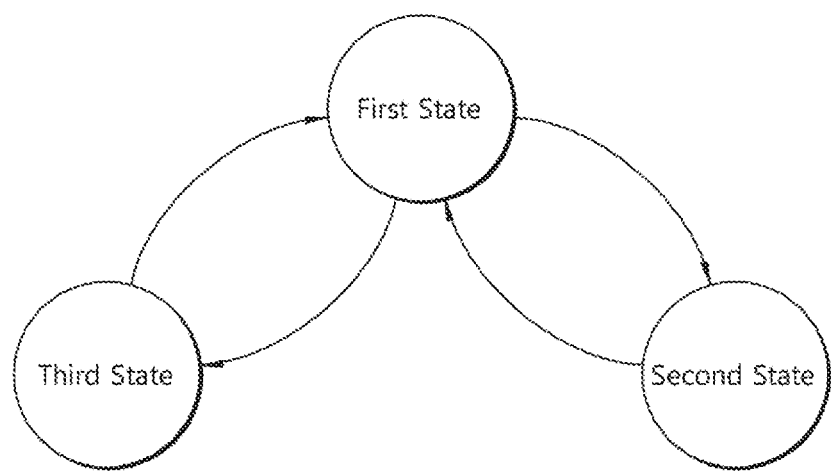
FIG. 9 is a state diagram illustrating another embodiment of a control method of the storage device in FIG. 4.

FIG. 9 is a state diagram illustrating another embodiment of the control method of the storage device 10, 10A or 10B in FIG. 4. As illustrated in FIG. 9, the control method of FIG. 4 may be implemented through the state machine having the first to third states, and include one or more embodiments on the first to third states. As such, the storage device 10, 10A or 10B can learn to adjust the data transfer delay time period, and thus find a suitable data transfer delay time period to cope with a host delay situation of the host 90. Therefore, the data reading efficiency can be improved. Furthermore, the storage device 10, 10A or 10B can avoid a burden of computing resources caused by unnecessary detection, using the third state. When it is determined that the host 90 reads data a plurality of times, the storage device 10, 10A or 10B may re-detect the host delay time, and adjust the data transfer delay time period. Thus, the storage device 10, 10A or 10B can dynamically cope with a host delay change of the host 90, thereby promoting data read efficiency.

However, the present invention is not limited to the above-described example. For example, the adjusted data transfer delay time period after the host transfers the read command may be set to the initial value of the data transfer delay time period when entering to the first state next time. For another example, the adjusted data transfer delay time period may be stored in the storage device 10, 10A or 10B and used afterwards.

Figure 10:
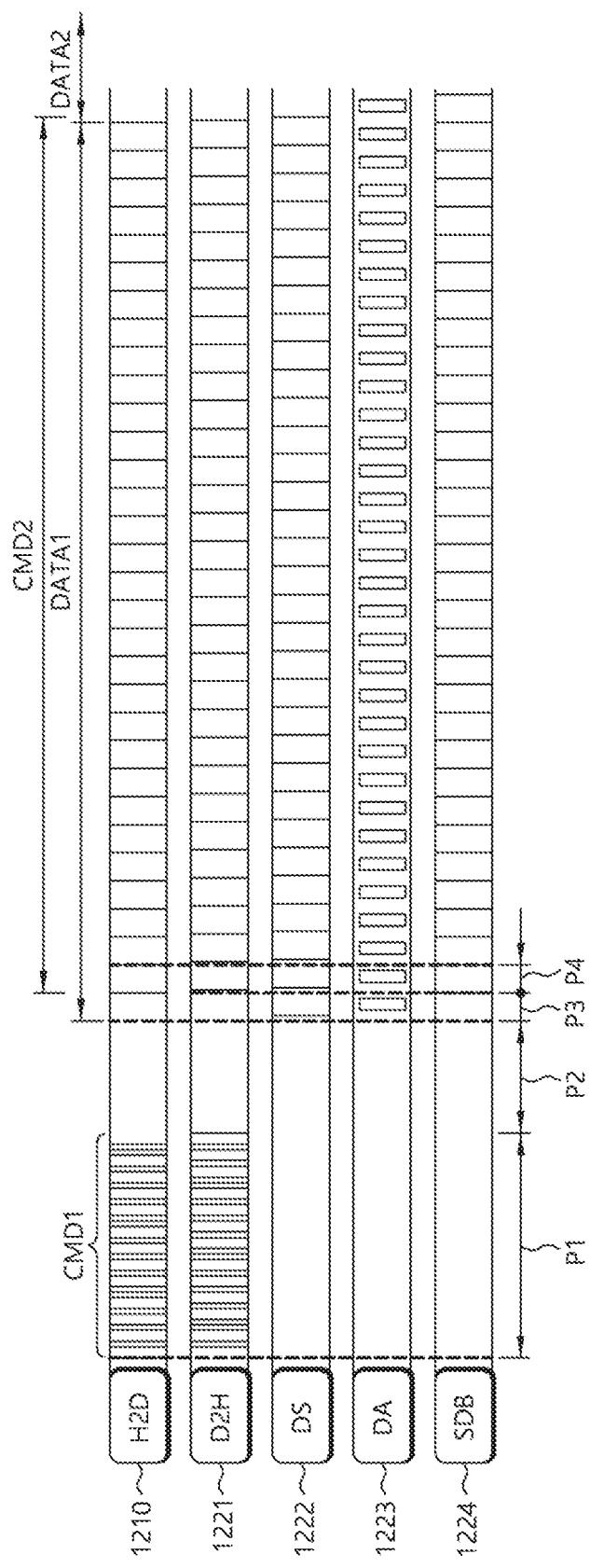
FIG. 10 is a diagram for describing an application of a control method of the storage device in FIG. 4.

FIG. 10 is a diagram for describing an example of the control method of the storage device 10, 10A or 10B in FIG. 4, when the control method is applied depending on situations. In an embodiment, the storage device 10, 10A or 10B may communicate with the host 90 through a SATA-based protocol.

As illustrated in FIG. 10, the time axis extending from a block 1210 may indicate the sequential order in which the host 90 transfers information frames H2D to the storage device 10, 10A or 10B through the transfer channel. Vertical line sections corresponding to the block 1210 may indicate a situation in which the host 90 transfers the information frames H2D representing a first group of read commands CMD1, for example.

The time axis extending from a block 1221 may indicate the sequential order in which the storage device 10, 10A or 10B transfers information frames D2H through the transfer channel in response to read commands transferred by the host 90 (for example, the first group of read commands CMD1). The vertical line sections in the figure may indicate a situation in which the storage device 10, 10A or 10B transfers the information frames D2H. The vertical lines sections may be positioned behind the respective information frames H2D.

The time axis extending from a block 1222 may indicate the sequential order in which the storage device 10, 10A or 10B transfers information frames DS through the transfer channel in response to the read commands transferred by the host 90 (for example, the first group of read commands CMD1). The vertical line sections in the figure may indicate a situation in which the storage device 10, 10A or 10B transfers the information frames DS.

The time axis extending from a block 1223 may indicate the sequential order in which the storage device 10, 10A or 10B transfers information frames DA through the transfer channel in response to the read commands transferred by the host 90 (for example, the first group of read commands CMD1). The small blocks in the figure may indicate a situation in which the storage device 10, 10A or 10B transfers the information frames DA in order to transfer data corresponding to the read commands to the host 90.

The time axis extending from a block 1224 may indicate the sequential order in which the storage device 10, 10A or 10B transfers information frames SDB through the transfer channel in response to the read commands transferred by the host 90 (for example, the first group of read commands CMD1). The vertical line sections in the figure may indicate a situation in which the storage device 10, 10A or 10B transfers the information frames SDB.

As illustrated in FIG. 10, the sequence in which the storage device 10, 10A or 10B transfers the information frames D2H, DS, DA and SDB through the transfer channel in response to the read commands (for example, the first group of read commands CMD1) transferred by the host 90 according to time change may be defined in a SATA-based transfer protocol. For example, SATA version II or upper version may support the operation mode of 'native command queuing (NCQ)'. In the operation mode of NCQ, a maximum of 32 command queues may be provided in the storage device 10, 10A or 10B so as to receive a command from the host 90. The command queues may be implemented by the buffer 13. However, the invention embodiment is not limited to the above-described example.

Referring back to FIG. 10, the first group of read commands CMD1 transferred to the storage device 10, 10A or 10B by the host 90 during a time period P1 may include 32 random read commands or another number of random read commands. The random read command may indicate a read command for reading data of 4 KB or less, for example. In other words, in the operation mode of NCQ, the host 90 may transfer the plurality of read commands at once, and wait for the storage device 10, 10A or 10B to transfer data to the host 90. During the time period P1, the storage device 10, 10A or 10B may transfer the plurality of information frames D2H to the host 90 in response to the first group of read commands CMD1.

There may be a waiting time indicated by a time period P2 in FIG. 10 since the storage device 10, 10A or 10B may be still processing a first read command among the first group of read commands CMD1 even after completely transferring the plurality of information frames D2H to the host 90.

During a time period P3, the storage device 10, 10A or 10B may start transferring the information frames DS, DA and SDB to the host 90 in response to the first read command of the first group of read commands CMD1, and thus complete a first data transfer operation in response to the first read command of the first group of read commands CMD1.

As indicated by a time period P4, the sufficient data transfer delay time period T1 (refer to FIG. 7) may be present after the first data transfer operation. Therefore, the host 90 may transfer a first read command of a second group of read commands CMD2 to the storage device 10, 10A or 10B during the time period P4 or the data transfer delay time period T1, and the storage device 10, 10A or 10B may also provide the information frame D2H in response to the first read command of the second group of read commands CMD2. Subsequently, the storage device 10, 10A or 10B may transfer the information frames DS, DA and SDB to the host 90 in response to a second read command of the first group of read commands CMD1, and thus complete the second data transfer operation in response to the second read command of the first group of read commands CMD1.

In this way, during a data transfer time period DATA1 of the first group, the storage device 10, 10A or 10B may transfer the information frames DS, DA and SDB to the host 90 group-by-group in response to the plurality of read commands of the first group of read commands CMD1, and thus complete a plurality of data transfer operations in response to the first group of read commands CMD1. Since the sufficient data transfer delay time period T1 (refer to FIG. 7), for example, the time period P4 is present after each of the data transfer operations, the host 90 may transfer the next read command of the second group of read commands CMD2 to the storage device 10, 10A or 10B, and the storage device 10, 10A or 10B may also provide the information frame D2H to the read command in response to the next read command of the second group of read commands CMD2.

When a data transfer delay time period DATA2 is started in response to the second group of read commands CMD2, the storage device 10, 10A or 10B may start transferring the information frames DS, DA and SDB to the host 90 in response to the first read command of the second group of read commands CMD2, and thus complete one data transfer operation in response to the first read command of the second group of read commands CMD2. Furthermore, since subsequent operations may be performed the same manner, description thereof may be omitted. However, the present invention is not limited to the above-described example.

As illustrated in FIG. 10, the data transfer delay time period of the storage device 10, 10A or 10B may be adjusted based on the detected host delay time, through the embodiment of the control method of FIG. 4. After the data transfer delay time period is adjusted, the host 90 may transfer the next read command, for example, one of the second group of read commands CMD2 due to the sufficient data transfer delay time period, while the storage device 10, 10A or 10B transfers the information frames DS, DA and SDB one group by one group in response to a read command of the read commands of the previous group, for example, the first group of read commands CMD1.

While the storage device 10, 10A or 10B transfers data in response to each read command of the first group of read commands CMD1 as illustrated in FIG. 10, the host 90 may transfer the read commands of the second group of read commands CMD2 one by one by effectively using the adjusted data transfer delay time period. The second group of read commands CMD2 may include 32 random read commands or another number of random read commands, and the random read command may indicate a read command for reading data of 4 KB or less, for example.

FIG. 10 illustrates a situation in which the memory controller 11, 11A or 11B of the storage device 10, 10A or 10B adjusts the data transfer delay time period by itself, such that the host 90 transfers the first group of read commands CMD1 and then effectively transfers the second group of read commands CMD2, according to the control method of FIG. 4, in order to effectively operate the transfer channel. However, the conventional storage device does not adjust the data transfer delay time period. Thus, when the data transfer delay time period is not enough for the host 90 to transfer the read commands, the host 90 needs to wait until the storage device completes all data transfer operations for the first group of read commands CMD1, and then can transfer the second group of read commands CMD2. As described with reference to the embodiment illustrated in FIG. 10, the control method of FIG. 4 may be used to improve the efficiency when the host 90 transfers read commands to the storage device 10, 10A or 10B, thereby improving the efficiency when the host 90 performs random read operations on the storage device 10, 10A or 10B.

Some embodiments include a non-transitory readable recording medium, which records a program code for controlling the processor of one storage device 10, 10A or 10B (for example, the memory controller 11, 11A or 11B) to execute the control method of FIG. 4, and the method may include one or more of the above-described embodiments of the method of FIG. 4 or combinations thereof. For example, the program code may include one or more programs or program modules for implementing steps S10 and S20 of FIG. 4, steps S100 and S130 of FIG. 5, one embodiment of the state machine of the control method of FIG. 4 or combinations thereof. The program codes of such modules may be operated in cooperation and executed in any suitable order, or executed in parallel to each other. When the processor executes such a program code, the storage device 10, 10A or 10B may perform an embodiment of the control method of FIG. 4. Examples of the readable recording medium may include firmware, ROM, RAM, memory card, optical information storage medium, magnetic information storage medium or any other suitable type of storage medium or memory, and the implementation of the present invention is not limited to the example.

In the embodiment related to the storage device 10, 10A or 10B or the memory controller 11, 11A or 11B, the host interface 110, the memory control component 111 and/or the memory interface 115 or combinations thereof may be implemented with one or more circuits. For example, the host interface 110, the memory control component 111 and/or the memory interface 115 or combinations thereof may be implemented with one or more circuits of a processor, a digital signal processor, a micro control device, a field programmable gate array (FPGA) and a programmable integrated circuit such as an application specific integrated circuit (ASIC), and implemented with a dedicated circuit or module. The memory controller 11, 11A or 11B 11, 11A or 11B may be implemented as a single chip. Furthermore, the detection or adjustment performed by the memory controller 11, 11A or 11B or the memory control component may be implemented by a software method such as a process, threading or program module or other software methods. However, the implementation of the present invention is not limited to the above-described example.

Various embodiments of the invention in the context of a memory controller, a storage device, control methods of the storage device, and a recording medium, have been described. Thus, the data transfer delay time period of the storage device 10, 10A or 10B may be adjusted based on the detected host delay time. For example, the embodiments can help the storage device 10, 10A or 10B to find a data transfer delay time period which is currently suitable for the host 90. Thus, the embodiments may be used to improve the efficiency when the host 90 transfers the read commands to the storage device 10, 10A or 10B, thereby improving the efficiency when the host 90 performs random read operations on the storage device 10, 10A or 10B.

In accordance with various embodiments, it is possible to provide a memory controller for a storage device, which can adjust a data transfer delay time period of the storage device based on one or more detected host delay times of a host, a storage device, a control method of a storage device, and a recording medium. For example, it is possible to help the storage device to find a data transfer delay time period which is currently suitable for the host. Therefore, some embodiments may be used to improve the efficiency when the host sends a read command to the storage device, thereby improving the efficiency when the host performs a random read operation on the storage device.

While various embodiments have been illustrated and described above, it will be understood to those skilled in the art that the embodiments described are examples only. Accordingly, the present invention is not limited to the described embodiments. Rather, the present invention further encompasses all modifications and variations of the described embodiments that fall within the scope of the claims and their equivalents.

What is claimed is:

1. A control method of a storage device, which includes a memory controller coupled to a memory device, receives a command of a host, and accesses the memory device according to the command, wherein the host cannot transfer a command to the storage device when the storage device transfers data read from the memory device to the host, and the memory controller sets a data transfer delay time period after transferring data to the host, the control method comprising the steps of:
   detecting, by the memory controller of the storage device, a host delay time of the host each time a read command is received from the host during the data transfer delay time period; and
   adjusting, by the memory controller, the data transfer delay time period based on one or more of the detected host delay times,
   wherein the host delay time is configured to include time elapsed from the start of the data transfer delay time period until the read command of the host is received.

2. The control method of claim 1, wherein the detecting comprises:
   setting, by the memory controller, an initial value of the data transfer delay time period;
   detecting the host delay time each time the read command is received from the host during the data transfer delay time period; and
   repeating the detecting of the host delay time a set number of times defined by a detection threshold value.

3. The control method of claim 1, wherein the data transfer delay time period is adjusted to a maximum value of the detected host delay times.

4. The control method of claim 1, wherein the data transfer delay time period is used for a direct memory access setup command.

5. The control method of claim 1, wherein the memory controller performs the detecting during an operation in a first state, and performs the adjusting during an operation in a second state, and the control method comprises switching the memory controller from the second state to the first state to perform the detecting, and redetecting the host delay time of the host, when the memory controller in the second state does not receive a read command from the host during each of the adjusted data transfer delay time periods.

6. The control method of claim 5, further comprising switching the memory controller from the second state to the third state, when the memory controller in the first state does not consecutively a read command from the host during the data transfer delay time period, wherein there is no data transfer delay time period after the memory controller in the third state transfers data to the host.

7. The control method of claim 6, further comprising switching the memory controller from the third state to the first state to detect the host delay time, when the memory controller in the third state receives a read command from the host a plurality of times.

8. The control method of claim 1, wherein the storage device communicates with the host using a Serial Advanced Technology Attachment (SATA)-based protocol.

9. The control method of claim 1, wherein the memory controller stores a program code for controlling a processor of a storage device to execute the control method.

10. A memory controller for a storage device, which includes the memory controller coupled to a memory device, receives a command of a host, and accesses the memory device according to the command, wherein the host cannot transfer a command to the storage device when the storage device transfers data read from the memory device to the host, and the memory controller sets a data transfer delay period after transferring data to the host, the memory controller comprising:
   a host interface configured to communicate with the host; and
   a memory control component coupled to the host interface, and configured to:
   receive one or more commands from the host by communicating with the host through the host interface, and access data stored in the storage device;
   detect a host delay time of the host each time a read command is received from the host during the data transfer time period; and
   adjust the data transfer delay time period based on one or more of the detected host delay times,
   wherein the host delay time is configured to include time elapsed from the start of the data transfer delay time period until the read command of the host is received.

11. The memory controller of claim 10, wherein the memory control component adjusts the data transfer delay time period to a maximum value of the detected host delay times.

12. The memory controller of claim 10, wherein the data transfer delay time period is used for a direct memory access setup command.

13. The memory controller of claim 10, wherein the memory control component detects each host delay time of the host during an operation in a first state; the memory control component adjusts the data transfer delay time period during an operation in a second state; and the memory control component is switched from the second state to the first state to redetect the host delay time of the host, when the memory control component in the second state does not receive a read command from the host during each of the adjusted data transfer delay time periods.

14. The memory controller of claim 13, wherein the memory control component is switched from the second state to the third state, when the memory control component in the first state does not consecutively a read command from the host during the data transfer delay time period, wherein there is no data transfer delay time period after the memory control component in the third state transfers data to the host.

15. The memory controller of claim 14, wherein the memory control component is switched from the third state to the first state to detect the host delay time, when the memory control component in the third state receives a read command from the host a plurality of times.

16. The memory controller of claim 10, wherein the storage device communicates with the host using a Serial Advanced Technology Attachment (SATA)-based protocol.

17. A storage device comprising the memory controller of claim 10, and further comprising:
 a memory configured to store data;
 wherein the memory controller is coupled to the memory and configured to access the memory of the storage device through communication with the host.

18. The storage device of claim 17, further comprising a memory interface coupled to the memory and configured to access the memory,
 wherein the memory interface is disposed within the memory controller.

19. An operating method of a controller of a storage device, which includes the controller coupled to a memory device, receives a command of a host, and accesses the memory device according to the command, the operating method comprising:
 providing the host with responses in response to one or more access requests from the host while waiting, after the transmission of each of the responses, an interval of intermission time for a subsequent access request from the host; and
 adjusting the intermission time based on one or more host delays of the subsequent access requests,
 wherein the controller and the host provide the responses and the access requests in a half-duplex way, and
 wherein each of the host delays is a time from a start of the corresponding intermission time to reception of a corresponding access request.

* * * * *